United States Patent [19]

Savage et al.

[11] 4,161,106
[45] Jul. 17, 1979

[54] APPARATUS AND METHOD FOR DETERMINING ENERGY WASTE IN REFRIGERATION UNITS

[75] Inventors: Robert H. Savage, Downey; Cecil G. Young, La Canada, both of Calif.

[73] Assignee: Water Chemists, Inc., Los Angeles, Calif.

[21] Appl. No.: 917,895

[22] Filed: Jun. 22, 1978

Related U.S. Application Data

[63] Continuation of Ser. No. 772,439, Feb. 28, 1977, abandoned.

[51] Int. Cl.[2] ............................................. F25B 49/00
[52] U.S. Cl. ......................................... 62/115; 62/129
[58] Field of Search ................. 62/DIG. 17, 129, 126, 62/209, 230, 208, 183, 115

[56] References Cited

U.S. PATENT DOCUMENTS

| | | | |
|---|---|---|---|
| 3,707,851 | 1/1973 | McAshan, Jr. | 62/129 |
| 3,803,863 | 4/1974 | Jednacz et al. | 62/209 |
| 4,038,061 | 7/1977 | Anderson et al. | 62/126 |

*Primary Examiner*—William E. Wayner
*Attorney, Agent, or Firm*—Christie, Parker & Hale

[57] ABSTRACT

The load of a compressor of a refrigeration unit is determined and from this determination a standard condenser head pressure is determined. This standard condenser head pressure is compared with measured condenser head pressure. If there is a null comparison, then the air conditioner is operating properly. If the condenser head pressure as measured varies beyond a band from the predetermined condenser head pressure for the load, it is symptomatic of less than optimum operating efficiency. Compressor load is determined as a function of the condenser cooling fluid temperature at the inlet and outlet from the condenser, or one of these temperatures and the power required by the compressor.

7 Claims, 2 Drawing Figures

APPARATUS AND METHOD FOR DETERMINING ENERGY WASTE IN REFRIGERATION UNITS

This is a continuation of application Ser. No. 772,439, filed Feb. 28, 1977, now abandoned.

BACKGROUND OF THE INVENTION

The present invention relates to refrigeration units in general and, more in particular, to an apparatus and method for determining whether a refrigeration unit is operating efficiently.

Obviously refrigeration units consume power. The efficiency of a refrigeration unit measures the amount of refrigeration effected for the power consumed in effecting the refrigeration. Clearly, the higher a refrigeration unit efficiency, the better its performance.

A refrigeration cycle takes cold refrigerant in liquid form and passes that refrigerant in heat exchange relationship with a cooling load in an evaporator. The refrigerant takes on heat and in so doing cools the load. The refrigerant is largely vaporized in the evaporator and leaves it in that state. As a vapor, the refrigerant is isentropically compressed to raise its pressure for introduction into a condenser. In the condenser the refrigerant is in two phases, liquid and vapor. A coolant, say cooling water, effects condensation of the refrigerant in the condenser by passing in heat exchange relationship with the refrigerant. There is a phase change, then, in the condenser. Refrigerant from the condenser expands adiabatically to reduce its temperature and passes again in heat exchange with load in the evaporator.

This idealized cycle forms the basis for an optimum efficiency determination. Performance falls short of this standard for several reasons. One such reason is that there are non-condensibles in the refrigerant. Another reason is fouling of the condenser. Other reasons include the condenser being overcharged with too much refrigerant and improper cooling water flow. This causes results in excessive pressure in the condenser head space. Inadequate cooling water flow through the condenser also results in a condenser head space pressure which is too high for the actual load, but which is too low relative to optimum, based on observance of only coolant temperature difference across the condenser.

These known causes of less than optimum efficiency have not been easily determined on a continuous basis and as a result too many refrigeration units operate inefficiently. With inefficient operation, too much energy is consumed.

SUMMARY OF THE INVENTION

The present invention takes advantage of the fact that compressor motor load in relation to head pressure is a strong indication of refrigerator unit condition. In one form this load is determined as a function of the condenser coolant outlet temperature and condenser coolant inlet temperature. In another form the present invention contemplates merely determining the load on the compressor motor and one or the other of the condenser coolant temperature. In either event, a theoretical condenser head pressure is determined. This head pressure should equal the observed head pressure. A variation indicates a departure from optimum operating conditions.

Compressor motor load is largely a function of the flow rate of refrigerant through it. At low loads, there will be low flow rates. This condition reflects the fact that the amount of heat removed from the environment is low. When more heat is removed from the environment, the refrigerant flow rate increases to keep up with required heat removal. When compressor motor load is determined by condenser coolant inlet and outlet temperature, the determination relies upon the fact that the greater the temperature difference between the coolant fluid inlet and outlet temperatures at reasonably constant coolant fluid flow rates, the greater the load. Large coolant fluid temperature differences indicate large amounts of heat removed. In addition, it is necessary to know either the coolant fluid inlet or outlet temperature so that the temperature difference between coolant and refrigerant can be related to refrigerant flow rate. When compressor motor load is a variable sensed directly, it is only necessary to know in addition either coolant fluid inlet or outlet temperature. Motor load can be determined as a function of current drawn by the motor to current drawn by the motor at rated capacity.

A specific form of the present invention contemplates a refrigerator unit which has an evaporator that cools some working fluid or air by evaporating a refrigerant so that the refrigerant's phase is changed from liquid to primarily vapor. Vaporized refrigerant is compressed in a compressor and introduced into a condenser. Heat energy is extracted from the refrigerant in the condenser to change its phase from vapor to primarily liquid. A cooling fluid passes in heat exchange relationship with the refrigerant in the condenser for the condensing function. The cooling fluid's inlet temperature into the condenser is determined. The cooling fluid's outlet temperature from the condenser is also determined. Obviously the outlet temperature will be greater than the inlet temperature. The condenser discharges refrigerant for expansion through an expansion valve and subsequent introduction into the evaporator. A pressure gauge determines the condenser head pressure. An analog computing circuit, armed with measured values of cooling fluid outlet temperature and cooling fluid inlet temperature and with observed condenser head pressure, determines any deviation of this observed condenser head pressure from the condenser pressure corresponding to optimum operating conditions.

In another form of the present invention the same refrigeration unit just described is employed except that the load on the compressor motor is determined directly, as in amperes or watts and this load is compared with rated load power requirements to get a function of actual-to-rated load. Cooling fluid inlet or outlet temperature to the condenser is then determined and a resulting condenser head pressure determined from these two factors. The resulting condenser head pressure is compared with observed head pressure to determine any departure from optimum efficiency.

These and other features, aspects and advantages of the present invention will become more apparent from the following description, appended claims and drawings.

DESCRIPTION OF THE PREFERRED EMBODIMENT

Figure 1:
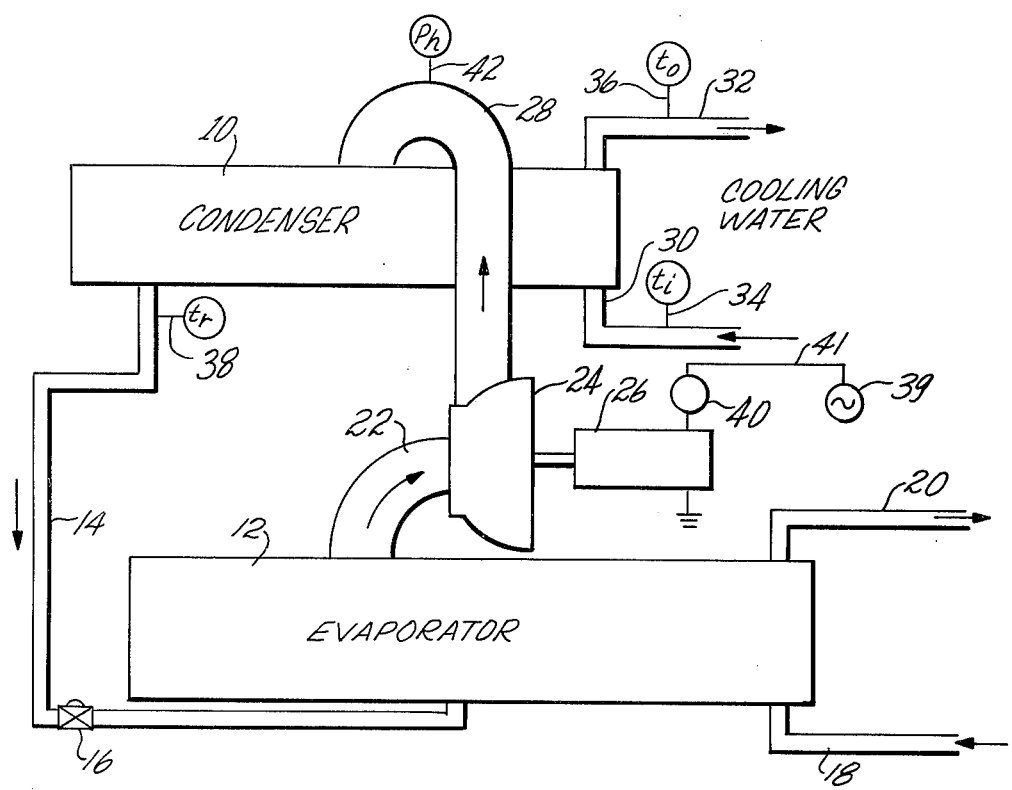
FIG. 1 illustrates a refrigerator unit constructed with the sensors necessary for the practice of the present invention.

With reference to FIG. 1, a refrigerator unit is illustrated. It may be, for example, an air conditioner. It includes a condenser 10. The condenser is in refrigerant fluid circuit with an evaporator 12 through a line 14. An expansion valve 16 in line 14 adiabatically expands refrigerant in line 14. Refrigerant passes into evaporator 12 where it is heated by a cooling load, shown entering the evaporator through line 18 and leaving the evaporator through line 20. The cooling load could be, for example, air or water. Refrigerant leaving evaporator 12 does so as a vapor through a line 22. This refrigerant is compressed by a compressor 24 driven by a compressor motor 26. The discharge from compressor 24 is in line 28 and it is introduced back into condenser 10. Cooling fluid is heated in the condenser in heat exchange with refrigerant so that heat is extracted from the refrigerant in the condenser. A cooling fluid, for example, cooling water or cooling air, enters the condenser through a line 30 and leaves the condenser at a higher temperature than its entrance temperature through a line 32.

Cooling fluid inlet temperature is determined by an instrument 34, which may be a resistance thermometer. Cooling fluid outlet temperature is determined by an instrument 36, which also may be a resistance thermometer. Condenser refrigerant outlet temperature, used in setting up the machine, is determined by an instrument 38. Compressor 24 derives its power from a source of electrical power 39. Current drawn by the motor may be determined through an amp or watt meter 40 in a line 41 from the source of power to the motor. Given the maximum capacity of the compressor in amps or watts, the ratio of actual load-to-load at maximum capacity is readily determined and can be a signal. A pressure sensing transducer 42 senses the head pressure in the condenser. Theoretically this pressure corresponds to the vapor pressure of the refrigerant at the temperature in the condenser. Refrigerant in the condenser will be in two phases. Accordingly, its state is determined either by temperature or pressure and quality.

An ideal condenser head pressure can be determined for a given refrigeration unit. Armed with this knowledge a comparison between observed condenser pressure and ideal condenser pressure yields an indication of the refrigeration unit's performance. Such a comparison can be by a difference determination and this type of comparison will be the subject of the analog computing circuit to be discussed subsequently.

The load on the refrigeration unit is also a function of condenser cooling fluid inlet and outlet temperatures and specifically a function of the difference between the two and either one or the other. Preferably the independent temperature variable is chosen to be cooling fluid inlet temperature. The load on the refrigeration unit is also a function of the ratio of current or watts drawn by the compressor motor to the rated current or watts and either the condenser cooling fluid inlet or outlet temperature, again preferably the cooling fluid inlet temperature.

Figure 2:
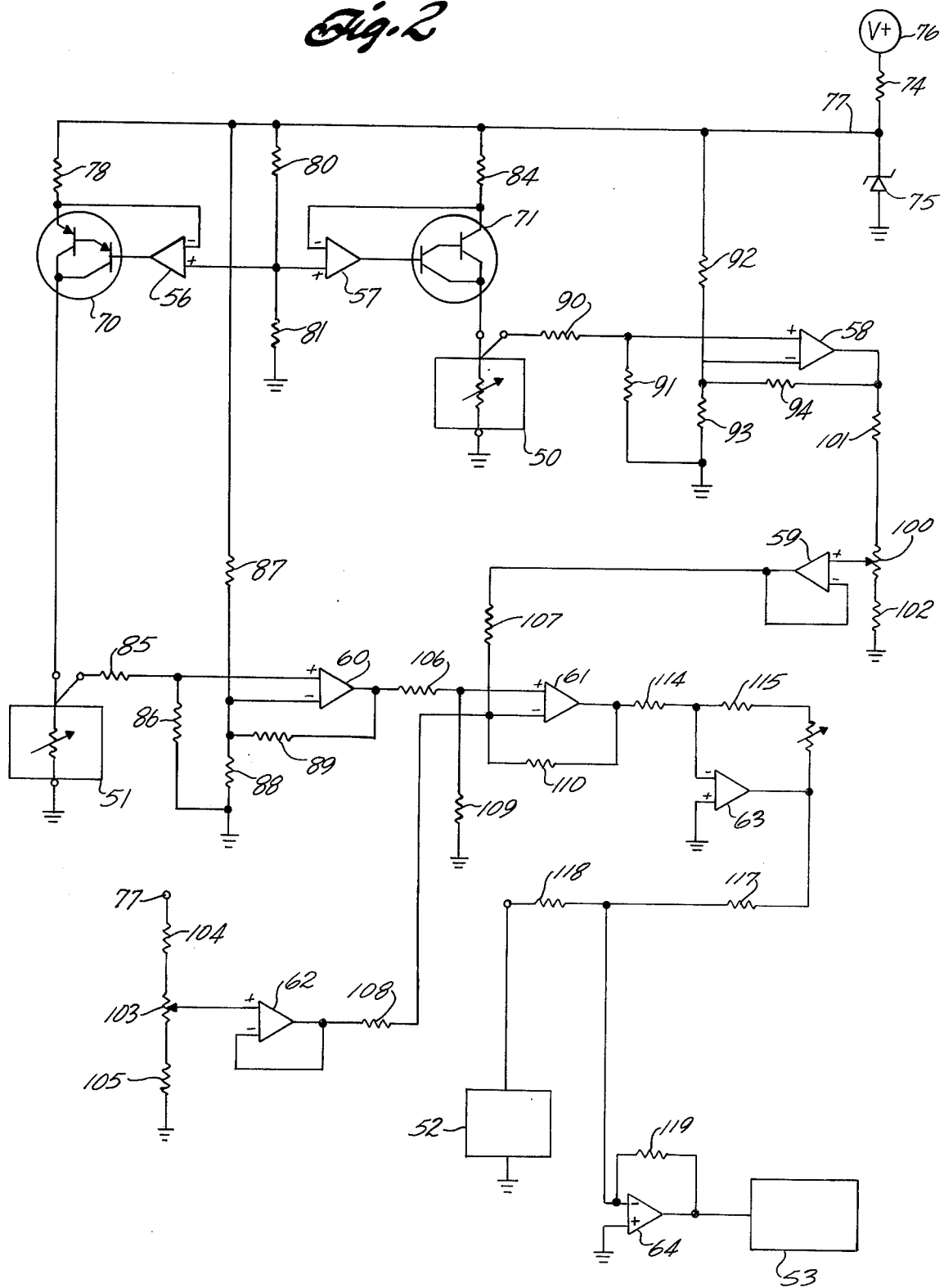
FIG. 2 is a circuit diagram of an analog computing circuit satisfactory for the practice of the present invention.

FIG. 2 shows an analog computing circuit for sensing, processing, and displaying monitored condenser parameters, namely condenser head pressure, condenser inlet water temperature, and condenser outlet water temperature. A resistance thermometer 50 is located at the condenser water inlet to sense the condenser inlet water temperature. A resistance thermometer 51 is located at the condenser water outlet to sense the condenser outlet water temperature. A pressure sensor 52 is located to sense condenser head pressure, say in the line between the compressor and condensor. The following equation expresses the condenser head pressure as a function of condenser inlet water temperature and condenser outlet water temperature under normal operating conditions:

$$P'_h = \frac{t_o - c_1 t_1 - c_2}{c_3}$$

where
 $P'_h$ is the computed value of condenser head pressure under normal operating conditions;
 $t_o$ is the sensed value of condenser outlet water temperature;
 $t_1$ is the sensed value of the condenser water inlet temperature; and
 $c_1$, $c_2$ and $c_3$ are constants related to machine and refrigerant characteristics with an assumed maximum level of non-condensibles.

In brief, with reference to the above equation, the analog computing circuitry processes signals representing $t_1$ and $t_o$ as sensed by resistance thermometers 50 and 51, respectively, to develop a signal representing $P'_h$; which is compared with a signal representing the actual condenser head pressure $P_h$ as sensed by strain gauge 52. The difference between the actual value and the computed value of condenser head pressure is indicated by a volt meter 53.

The analog computing circuit comprises differential amplifiers 56, 57, 58, 59, 60, 61, 62, 63 and 64, Darlington transistors 70 and 71, and a number of interconnecting resistors. Each of the differential amplifiers has a positive input and a negative input. If the signal applied to the positive input is larger than the signal applied to the negative input, the output of the differential amplifier is positive, and vice versa.

A resistor 74 and a back biased Zener diode 75 connect in series between a source 76 of positive direct current potential and ground. Zener diode 75 is operating at its Zener breakdown voltage and therefore serves to regulate the potential at a junction 77 between resistor 74 and Zener diode 75. A resistor 78, the emitter and collector of Darlington transistor 70, and resistance thermometer 51 are connected in series between junction 77 and ground. Resistors 80 and 81 are connected between junction 77 and ground to form a voltage divider. The junction of resistors 80 and 81 is connected to the positive input of differential amplifier 56. The emitter of transistor 70 connects to the negative input of differential amplifier 56 and the output of differential amplifier 56 connects to the base of Darlington transistor 70. Thus, differential amplifier 56 and Darlington transistor 70 serve as a constant current source for resistance thermometer 51 so that changes in voltage across resistance thermometer 51 are solely attributable to changes in its resistance and therefore its temperature.

Similarly, a resistor 84, Darlington transistor 71, and resistance thermometer 50 are connected in series between junction 77 and ground, while the positive input of differential amplifier 57 is connected to the junction of resistors 80 and 81, the emitter of Darlington transistor 71 is connected to the negative input of differential amplifier 57, and the output of differential amplifier 57 is connected to the base of Darlington transistor 71. Thus Darlington transistor 71 and differential amplifier 57 serve as a constant current source for resistance thermometer 50.

A resistor 85 connects between the ungrounded terminal of resistance thermometer 51 and the positive input of differential amplifier 60. A resistor 86 connects from the positive input of differential amplifier 60 to ground. The junction of resistors 87 and 88, which are in series between junction 77 and ground, connects to a negative input of differential amplifier 60. A feedback resistor 89 couples from the output to the negative input of differential amplifier 60. Connected as described, differential amplifier 60 serves to amplify without polarity change and to offset the signal representing the temperature sensed by resistance thermometer 51.

Similarly, differential amplifier 58 is connected to amplify without polarity change and to offset the signal representing the temperature sensed by resistance thermometer 50. To this end, a resistor 90 connects between the ungrounded terminal of resistance thermometer 50 and the positive input of differential amplifier 58; a resistor 91 connects from the positive input of differential amplifier 58 to ground; the junction of resistors 92 and 93, which are in series between junctions 77 and ground, connects to the negative input of differential amplifier 58; an a feedback resistor 94 is coupled from the output to the negative input of differential amplifier 58.

As a result of the offset provided by differential amplifiers 58 and 60, the temperature representative signals at both their outputs are zero in value at some predetermined value of temperature sensed by resistance thermometers 50 and 51, e.g., at 0° F.

The slider arm of a potentiometer 100 which is in series with resistors 101 and 102 between the output of differential amplifier 58 and ground, is connected to the positive input of differential amplifier 59. Thus, the output signal from differential amplifier 58 is coupled to the positive input of differential amplifier 59 attenuated by a factor determined by the setting of potentiometer 100. Potentiometer 100 is adjusted to provide the desired value of the constant $c_1$ in the above equation. Differential amplifier 59 has a direct feedback connection from its output to its negative input to provide a unity gain without polarity reversal for the signal applied to its positive input. Thus, differential amplifier 59 serves to isolate and to prevent loading of potentiometer 100. It also provides a low driving impedance to resistor 107, assuring accurate computation by amplifier 61, regardless of setting of potentiometer 100.

The slider arm of a potentiometer 103, which is in series with resistors 104 and 105 between junction 77 and ground, is connected to the positive input of differential amplifier 62. Thus, the regulated potential at junction 77 is applied to the positive input of differential amplifier 62 attenuated by a factor determined by the setting of potentiometer 103. Potentiometer 103 is adjusted to provide the desired value of the constant $c_2$ in the above equation. Differential amplifier 62 has a feedback connection from its output to its negative input to provide unity gain without polarity reversal for the potential at its positive input. Thus, differential amplifier 62 serves to isolate and prevent loading of potentiometer 103.

Differential amplifier 61 serves to additively combine the outputs of differential amplifiers 59, 60 and 62 to form the numerator in the above equation. To this end, a resistor 106 connects the output of differential amplifier 60 to the positive input of differential amplifier 61, a resistor 107 connects the output of differential amplifier 59 to the negative input of differential amplifier 61, and a resistor 108 connects the output of differential amplifier 62 to the negative input of differential amplifier 61. A resistor 109 is connected from the positive input of differential amplifier 61 to ground and a resistor 110 is connected from the output to the negative input of differential amplifier 61, which provides unity gain without polarity reversal to the input from amplifier 60 and unity gain with polarity reversal from amplifiers 59 and 62.

Differential amplifier 63 amplifies the output signal from differential amplifier 61 by the reciprocal of the constant $c_3$ in the above equation and provides a polarity reversal. A resistor 114 is connected from the output of differential amplifier 61 to the negative input of differential amplifier 63. The positive input of differential amplifier 63 is grounded. A resistor 115 and a variable resistor 116 are connected in series from the output to the negative input of differential amplifier 63. The setting of variable resistor 116 provides the desired value of the constant $c_3$. Thus, the output signal from differential amplifier 63 represents the negative of the computed value of condenser head pressure $-P'_h$.

The output of differential amplifier 63 and the output of strain gauge 52 are connected by resistors 117 and 118, respectively, to the negative input of differential amplifier 64. The positive input of differential amplifier 64 is grounded. A resistor 119 provides feedback from the output to the negative input of differential amplifier 64. The output of differential amplifier 64 is connected to the positive input of volt meter 53, the negative input of which is grounded. Thus, differential amplifier 64 amplifies, for purposes of indication by volt meter 53, the signal applied to its negative input, which represents the difference between the actual and computed values of condenser head pressure.

The principles behind the invention and the development of the equation presented earlier will now be discussed.

The principal electric power required to operate a mechanical compression type refrigeration system is the power required to run the compressor. The power required to drive the compressor is a function of the discharge pressure against which the compressor is working. Since the compressor discharges the compressed refrigerant directly into the condenser, the head pressure in the condenser is related directly to the electric power required to drive the compressor at a given cooling load. For maximum operating efficiency it is, therefore, necessary to keep the head pressure in the condenser to a minimum possible level as the cooling load varies throughout its normal range. When this is done, energy waste is held to a minimum.

The head pressure in the condenser is primarily a function of the temperature of the refrigerant vapor and liquid in the condenser. If the refrigerant contained no contaminants, the head pressure would be equal to the vapor pressure of the pure refrigerant as found on normal vapor pressure-temperature curves.

The design temperature of the refrigerant in the condenser determines the head pressure because the refrigerant is in two phases in the condenser, and pressure under this circumstance becomes a variable of temperature. The design temperature at a given operating load is established by the design of the refrigerant system. As the load varies, the temperature and the head pressure will vary in a predictable manner so long as the system is maintained properly.

This invention establishes a definite relationship between the head pressure, the inlet condenser coolant temperature, and the outlet condenser coolant temperature at a given cooling load so long as the system is properly maintained. The manner in which this relationship varies with load variations has also been established. By relatively unsophisticated instrumentation it is easy to compare the measured head pressure with an automatically computed value derived from measured condenser coolant temperatures to signal when it is necessary to do something to the refrigeration unit to bring it into optimum operating conditions.

The constants of the equation presented earlier, $c_1$, $c_2$ and $c_3$, which are used by the analog computer in solving the equation are the result of the following: (1) the design of the particular refrigeration unit, or (2) the characteristics of the refrigerant used, and (3) the maximum allowable non-condensible level desired.

The values of these constants can be readily determined by operating the refrigeration system at its rated load, while clean, and measuring the values of condenser coolant inlet, outlet temperatures, and liquid refrigerant temperature as it leaves the condenser, and the head pressure in the condenser under various conditions to develop three simultaneous equations. The values obtained are fixed and permanent characteristics for a given refrigeration system so long as it uses the same refrigerant. These set-up values of $c_1$, $c_2$, and $c_3$, are used as permanent adjustments made to the computer at the time of installing the instrumentation system.

Thus the present invention provides a very easy way of determining refrigeration's performance. Refrigeration performance can adversely be affected by such things as non-condensibles in the refrigerant, fouled condensers, over-refrigerant supply, and the like. These known factors can adversely affect the efficiency of the refrigeration and by this effect result in greater power consumption for a given amount of refrigeration effected.

One condition which should be explained is when insufficient coolant circulates through the condenser. When this happens the temperature of the coolant across the condenser is higher than it would be for the actual refrigeration load. The apparatus of the invention will determine a theoretical head pressure higher than actual and the instrument will reflect a negative difference.

The present invention recognizes that there is a very strong correlation between refrigeration unit condition and condenser head pressure. Observed condenser head pressure is compared with an ideal condenser head pressure obtained as a function of load on the compressor motor and either condenser cooling fluid inlet or outlet temperature. Alternatively, condenser coolant fluid inlet and outlet temperatures can be determined and the difference between these and the absolute value of one used to determine theoretical condenser head pressure.

The present invention has been described with reference to certain preferred embodiments. The spirit and scope of the appended claims should not, however, necessarily be limited the foregoing description.

What is claimed is:

1. In a refrigeration unit of the type having a condenser with a refrigerant fluid inlet and a refrigerant fluid outlet, an evaporator with refrigerant fluid inlet and a refrigerant fluid outlet, a compressor with a refrigerant fluid inlet and a refrigerant fluid outlet, the outlet of the condenser being in series fluid circuit with the inlet of the evaporator, the outlet of the evaporator being in series fluid circuit with the inlet of the compressor, and the outlet of the compressor being in series fluid circuit with the inlet of the condenser, motor means to drive the compressor, coolant fluid circuit means for cooling the refrigerant in the condenser, the coolant fluid circuit means having an inlet to the condenser and an outlet from the condenser, and refrigeration load circuit means for being cooled by refrigerant in the evaporator, an improvement to sense performance of the refrigeration unit comprising:

(a) means to sense the load on the compressor motor;
(b) means to determine an optimum value of the condenser head pressure within the condenser from the load sensed by the sensing means;
(c) means to sense the actual condenser head pressure; and
(d) means to compare the two head pressures to determine deviations from optimum performance.

2. The improvement claimed in claim 1 wherein the load sensing means includes means to sense the condenser coolant fluid inlet temperature and means to sense the condenser coolant outlet temperature, the means to determine the optimum condenser head pressure does so from these differences.

3. The improvement claimed in claim 2 wherein each of the temperature sensing means includes a resistance thermometer.

4. The improvement claimed in claim 3 wherein the means to determine the optimum condenser head pressure includes an analog computer means.

5. The improvement claimed in claim 2 wherein the means to determine the optimum condenser head pressure includes an analog computer means.

6. A method for detecting inefficiency of a refrigeration unit comprising:

sensing the load on the compressor motor of a refrigeration unit while the compressor is compressing refrigerant from the outlet of an evaporator to a condenser head pressure corresponding to the pressure of refrigerant with a condenser;
sensing either the coolant fluid inlet or coolant fluid outlet temperature of coolant fluid passed through the condenser to condense the refrigerant;
determining the optimum condenser head pressure from the sensed values;
determining the actual condenser head pressure; and
indicating the difference between the optimum condenser head pressure and observed head pressure.

7. The method claimed in claim 6 wherein the load sensing step includes measuring the temperatures of both the coolant fluid inlet and coolant fluid outlet and wherein the optimum condenser head pressure determination is determined as a function of the difference between these two temperatures.

* * * * *

UNITED STATES PATENT AND TRADEMARK OFFICE
CERTIFICATE OF CORRECTION

PATENT NO. : 4,161,106

DATED : July 17, 1979

INVENTOR(S) : Robert H. Savage and Cecil G. Young

It is certified that error appears in the above-identified patent and that said Letters Patent are hereby corrected as shown below:

In the specification: Column 1, line 61, "temperature" should be --temperatures--; Column 5, line 27, "an" should be --and--.

In the claims: Claim 6, column 8, line 50 "with" should be --within--.

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*